United States Patent [19]

Okamura et al.

[11] 4,417,040

[45] Nov. 22, 1983

[54] ANAEROBICALLY CURABLE SEALING COMPOSITION

[75] Inventors: Yasuhumi Okamura; Aritatsu Masaoka; Kazutaka Kishita, all of Hachioji, Japan

[73] Assignee: Three Bond Co., Ltd., Tokyo, Japan

[21] Appl. No.: 320,777

[22] Filed: Nov. 12, 1981

[30] Foreign Application Priority Data

Nov. 13, 1980 [JP] Japan ................... 55-160032

[51] Int. Cl.³ .................... C08F 4/36; C08F 20/20
[52] U.S. Cl. ................... 526/323.1; 526/204; 526/270; 526/271; 526/301; 526/313; 526/320; 526/323.2
[58] Field of Search ............ 526/204, 323.1, 323.2, 526/270, 271, 301, 313, 320

[56] References Cited

U.S. PATENT DOCUMENTS

3,517,032  6/1970  Milas et al. .................... 526/204

Primary Examiner—Harry Wong, Jr.
Attorney, Agent, or Firm—Martin A. Farber

[57] ABSTRACT

An anaerobically curable sealing composition comprising a polymerizable monomer (A) consisting of an acrylic ester or a methacrylic ester, and 3,6,6,9,9-pentamethyl-3-n-butyl-1,2,4,5-tetraoxacyclonine (B) as a polymerization initiator, characterized in that the amount of ratio of said (A) and (B) being:

(A) 99.95–80 parts by weight,
(B) 20–0.05 parts by weight, whereby, providing to the composition better anaerobic characteristics and storage stability.

2 Claims, No Drawings

ANAEROBICALLY CURABLE SEALING COMPOSITION

BACKGROUND OF THE INVENTION

This invention relates to an anaerobically curable sealing composition essentially comprising an acrylic ester or a methacrylic ester (hereinafter stated as a (meth)acrylic ester), having excellent anaerobic characteristics and outstanding storage stability.

An anaerobically curable sealing composition essentially comprising a (meth)acrylic ester is characterized in that the composition will be kept stable in liquid state as long as it remains in contact with air or oxygen, while rapidly curing under the exclusion of air or oxygen. Thus, the composition is widely used in all fields of industries as adhesives, loosening prevention materials for bolts and nuts, and leak-preventing materials.

As the above-mentioned anaerobically curable sealing compositions comprising a (meth)acrylic ester, compositions having a (meth)acrylic ester as a polymeric monomer and an organic peroxide as its main ingredients have been known in the art, such as in the Japanese Pat. Publication Nos. 35-2393, 38-3595, the U.S. Pat. No. 3,435,012 and also in the Japanese Pat. Publication No. 45-17080. In these compositions are used such organic peroxides as cumen hydroperoxide, di-alkyl peroxide, etc. These organic hydroperoxides are comparatively appropriate in that they provide to the obtained compositions anaerobic characteristics, but the cure accelerating agents and other components contained in the compositions containing a hydroperoxide have a disadvantage that they give rise to a decrease in adhesive force after a long storage and are deficient in storage stability.

The inventors of this invention have successfully found methods to obtain anaerobically curable compounds, which have greater adhesive force, compared with conventional anaerobically curable sealing compositions having a hydroperoxide or a di-alkyl peroxide as a polymerization initiator, and are excellent in storage stability, by way of using 3,6,6,9,9-penta-methyl-3-n-butyl-1,2,4,5-tetra-oxacyclonine (hereinafter called Composition (1)) among the peroxiketanol group, having the structural formula of

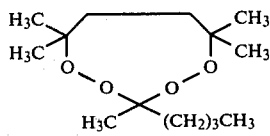

as a polymerization initiator of the afore-mentioned anaerobically curable sealing compositions comprising of a (meth)acrylic ester.

SUMMARY OF THE INVENTION

Accordingly, the object of this invention is to provide an anaerobically curable sealing composition comprising a (meth)acrylic ester characterized in that it has excellent anaerobic characteristics and is excellent in storage stability.

According to this invention, this and other objects can be accomplished by using the afore-mentioned Composition(1) as a polymerization initiator in an anaerobically curable sealing composition having polymerizable monomers essentially comprising a (meth)acrylic ester and a polymerization initiator.

This and other objects and advantages of this invention become more apparent and fully understood from the hereinafter detailed description.

DETAILED DESCRIPTION

The (meth)acrylic ester polymerizable monomers to be used in this invention can be any kind of acrylic monomers, among which are included polyester poly(meth)acrylate, polyolpoly(meth)acrylate, epoxypoly(meth)acrylate, reactive composition of acrylic ester or methacrylic ester, monoepoxide and acid anhydride, polyurethane-poly(meth)acrylate, poly(meth)acrylate of added alcohol of phenolic composition and oxide composition, composition to be designated by the general formula of M—G—OH (where, M represents acrylic ester or methacrylic ester residue, G represents glycol residue), mono(meth)acrylate having the general formula of

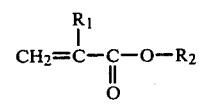

(where, $R_1$ represents hydrogen or methyl radicals, $R_2$ is hydrogen, alkyl radical having from 1 to 9 carbon atoms,

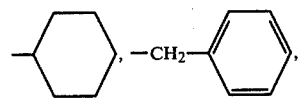

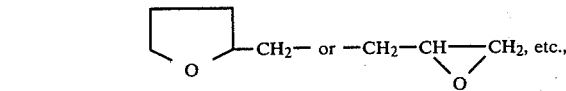

In this invention, one kind or combination of more than two kinds of these (meth)acrylic esters can be used.

The above-mentioned Composition(1) to be used in this invention functions as a polymerization initiator. This composition can be obtained with ease in conventional methods by making ketone react with corresponding di-hydroperoxides. The amount of the Composition(1) to be used as a polymerization initiator in this invention is within the range of 0.05-20 parts, or preferably 0.1-10 parts by weight to 100 parts of one or more than two kinds of the (meth)acrylic esters. When the amount of the Composition(1) is 0.05 parts by weight or less, the composition to be obtained does not polymerize enough even under anaerobic conditions and therefore does not cure enough for practical use. On the contrary, when the amount of the Composition(1) exceeds 20 parts by weight, any proportional increase of anaerobic characteristics cannot be observed, and it is feared that the cured composition becomes inferior in physical properties, and also it is not economically desirable.

The composition of this invention can be obtained by adding the above-mentioned Composition(1) to the aforesaid polymerizable monomer comprising a (meth)acrylic ester, and by mixing the obtained mixture to obtain a homogeneous solution. The methods of adding the Composition(1) to the (meth)acrylic ester are not particularly limited, and one of the methods, for example, is to add the Composition(1) little by little to the polymerizable monomer, while the latter is being agitated, until the former becomes evenly mixed in the monomer to form a homogeneous solution.

In order to improve characteristics of the anaerobically curable sealing composition of this invention, known cure accelerators, polymerization inhibitors, stabilizers, agents to increase adhesives, thickeners, agents to provide thixotropic characteristics, plasticizers, coloring agents, etc. can be used, in addition to the afore-mentioned (meth)acrylic ester and the Composition(1). And further, organic hydroperoxides such as hydroperoxide and di-hydroperoxide can also be used when needed.

The thus obtained anaerobically curable sealing composition has excellent anaerobic characteristics and is excellent in storage stability.

The following examples are given by way of illustration but are not to be construed to limit the scope of the invention. In these examples, all the terms "part(s)" are part(s) by weight.

EXAMPLE 1

An anaerobically curable sealing composition was prepared by adding 5 parts by weight of the Composition(1) to 100 parts by weight of tri-methylol-propane-trimethacrylate of commercial grade, while the latter being agitated. The obtained composition was put in a polyethylene bottle to its half capacity and left standing at room temperature for more than one year. After this period the composition was still in liquid state. Several drops of the composition were applied onto the threaded parts of bolts and nuts, which were then tightened. As a result, the composition cured in 30 minutes at 25° C., to the extent that the bolts and nuts could not be turned back by fingers.

EXAMPLE 2

Compositions of various amounts of the Composition(1) were prepared in the same manner as in Example 1. They were applied to iron bolts and nuts having a diameter of 1.0 cm and a length of 1.5 cm, which were assembled and left standing at 25° C., and cure time was measured at intervals of every five minutes. When the assembled bolts and nuts become so tight that they cannot be returned by fingers, then the period between such a time and the time of assembly was designated as cure time. The obtained results are shown in Table I.

From Table I, it is apparent that cure time of each sample becomes substantially long and unsuitable for practical use when the amount of the Composition(1) is 0.05 parts or less. When the amount is 10 part or more, variation of cure time is not observed, but the samples A and B which have more than 20 parts showed small adhesion force, and the fixed bolt and nut could be loosened by fingers.

TABLE I

Relation Between Amount of Composition(1) And time

| Test No. | Sample No. (Amounts added) | | | | | | | | | | |
|---|---|---|---|---|---|---|---|---|---|---|---|
| | A (30) | B (25) | C (20) | D (18) | E (10) | F (5) | G (1) | H (0.5) | I (0.05) | J (0.01) | K (0.005) |
| 1 | 15 (min) | 15 | 15 | 15 | 20 | 30 | 40 | 70 | 100 | 1800 | Did not |
| 2 | 20 | 20 | 20 | 15 | 15 | 30 | 60 | 80 | 120 | — | cure |
| 3 | 20 | 20 | 20 | 20 | 20 | 50 | 80 | 120 | 2200 | even | |
| 4 | 20 | 15 | 15 | 20 | 15 | 30 | 50 | 60 | 110 | 2200 | after |
| 5 | 15 | 20 | 20 | 20 | 20 | 20 | 50 | 60 | 100 | — | 50 days |
| Average | 18 | 18 | 18 | 18 | 18 | 30 | 50 | 60 | 110 | 2000 | |

EXAMPLE 3

As Table II shows, a composition(Sample N) having the Composition(1) and compositions (Samples L and M) having conventional organic peroxide in place of the Composition(1) were prepared in the same manner as in Example 1. With these samples, adhesion forces were measured, using same grease-free bolts and nuts as used in Example 2, immediately after the preparation and after the accelerated storage stability test. The results of the tests are stated in Table II. In the "test immediately after preparation," the samples were coated on the threaded parts of grease-free bolts and nuts, which were assembled and left standing at room temperature for 24 hours, and then the return torque was measured. The accelerated storage stability test was conducted by subjecting 30 g each of the compositions in 50 g capacity polyethylene bottles, to 50° C. for 10 days. This acceleration is generally considered to be equal to the conditions of one year period at room temperature(25° C.). The obtained results are shown in Table II.

As is apparent from Table II, the composition having the Composition(1) shows greater return torque and better storage stability than the compositions (Samples L and M) having conventionally known organic hydroperoxides, immediately after the preparation and after storage. The differences become most substantial after storage.

Especially, the Samples L and M are remarkably poor in return torque after the accelerated storage stability test compared with the case of the composition (Sample N) of this invention.

TABLE II

Relations between Kinds of Polymerization Initiators and Return Torque

| | | Sample L | Sample M | Sample N |
|---|---|---|---|---|
| Amount of compositions (parts) | Trimethylol-propane trimethacrylate | 50 | 50 | 50 |
| | Dioctilfutarete | 50 | 50 | 50 |
| | O—Sulfobenzoic imide | 1 | 1 | 1 |
| | n-dodecyl mercaptan | 0.5 | 0.5 | 0.5 |
| | Cumen Hydroperoxide | 1 | | |
| | 2,5-dimethyl-2,5-di-(t-butylperoxy)hexyne-3 | | 1 | |
| | Composition(1) | | | 1 |
| Test Results | Return torque immediately after preparation kg-cm | 80 | 60 | 100 |
| | Return torque after accelerated storage stability test kg-cm | 20 | 20 | 90 |
| | Storage Stability Test, | gelated | gelated | no gelation |

From the above-mentioned results, it has come to be known that the composition of this invention comprising a polymerizable monomer and the Composition(1) exhibits excellent storage stability which compositions having initiators of conventional organic hydroperoxides have not ever attained, and that it also maintains desirable anaerobic characteristics.

We claim:

1. In an anaerobically curable sealing composition comprising a polymerizable monomer (A) consisting of an acrylic ester or a methacrylic ester, and a (B) polymerization initiator, an improvement wherein the said polymerization initiator comprises 3,6,6,9,9-penta-methyl-3-n-butyl-1,2,4,5-tetra-oxacyclonine, thereby to provide the obtained composition better anaerobic characteristics and storage stability.

2. The composition as claimed in claim 1 wherein the amount of the said 3,6,6,9,9-penta-methyl-3-n-butyl-1,2,4,5-tetra-oxacyclonine is within the range of 0.05–20 parts by weight to 100 parts by weight of said polymerizable monomer.

* * * * *